(12) United States Patent
Lee et al.

(10) Patent No.: US 11,936,075 B2
(45) Date of Patent: Mar. 19, 2024

(54) SEPARATOR FOR SOLID OXIDE FUEL CELL (SOFC) STACK CAPABLE OF MINIMIZING SYSTEM VOLUME AND USAGE OF SEALANT

(71) Applicant: KOREA INSTITUTE OF SCIENCE AND TECHNOLOGY, Seoul (KR)

(72) Inventors: Jong Ho Lee, Seoul (KR); Kyung Joong Yoon, Seoul (KR); Ji Won Son, Seoul (KR); Seong Kook Oh, Seoul (KR); Sang Hyeok Lee, Seoul (KR); Dong Hwan Kim, Seoul (KR); Min Jun Oh, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 223 days.

(21) Appl. No.: 17/558,460

(22) Filed: Dec. 21, 2021

(65) Prior Publication Data

US 2023/0170495 A1    Jun. 1, 2023

(30) Foreign Application Priority Data

Dec. 1, 2021    (KR) .................. 10-2021-0170226

(51) Int. Cl.
*H01M 8/0247* (2016.01)
*H01M 8/0228* (2016.01)
*H01M 8/12* (2016.01)

(52) U.S. Cl.
CPC .......... *H01M 8/0228* (2013.01); *H01M 8/12* (2013.01); *H01M 2008/1293* (2013.01)

(58) Field of Classification Search
CPC ............ H01M 8/0247; H01M 8/0202; H01M 8/0258; H01M 8/026; H01M 2008/1293; H01M 8/2425; H01M 8/12–1273
See application file for complete search history.

(56) References Cited

U.S. PATENT DOCUMENTS

| | | | |
|---|---|---|---|
| 2010/0021779 A1* | 1/2010 | Bae ..................... | H01M 8/1213 429/423 |
| 2010/0062316 A1* | 3/2010 | Izawa ................. | H01M 8/0258 216/13 |

(Continued)

FOREIGN PATENT DOCUMENTS

| | | |
|---|---|---|
| JP | 2020140923 A | 9/2020 |
| KR | 1020130075902 A | 7/2013 |

(Continued)

*Primary Examiner* — Jeremiah R Smith
(74) *Attorney, Agent, or Firm* — Rabin & Berdo, P.C.

(57) ABSTRACT

Disclosed are a separator for fuel cells capable of minimizing the volume of a system and the use of sealants, and a stack for fuel cells, more particularly, a stack for solid oxide fuel cells, including the same. Specifically, by adding a metal sheet having a specific shape, position and size to the separator, the stress applied to the sealant can be uniformized, and thus the oxidizing agent and fuel can be separated and electrically isolated using only a piece of sealant. Therefore, the stack for fuel cells is characterized in that there is no variation in temperature, reactant concentration, power, or the like between respective unit cells, so delamination and microcracks do not occur, the volume is minimized, and the power density per unit volume is very high.

4 Claims, 5 Drawing Sheets

(56) References Cited

U.S. PATENT DOCUMENTS

| | | | | |
|---|---|---|---|---|
| 2010/0209802 A1* | 8/2010 | Armstrong | .......... | H01M 8/2483 |
| | | | | 429/469 |
| 2015/0263372 A1* | 9/2015 | Choi | .................. | H01M 8/0273 |
| | | | | 429/465 |
| 2015/0303491 A1* | 10/2015 | Choi | .................. | H01M 8/2457 |
| | | | | 429/513 |
| 2016/0380298 A1* | 12/2016 | Leah | .................. | H01M 8/2432 |
| | | | | 429/465 |
| 2019/0305351 A1* | 10/2019 | Lee | .................... | H01M 8/0258 |
| 2019/0372134 A1* | 12/2019 | Katikaneni | ......... | H01M 8/1213 |
| 2022/0302472 A1* | 9/2022 | Ino | .................... | H01M 8/0232 |

FOREIGN PATENT DOCUMENTS

| | | |
|---|---|---|
| KR | 1020180043843 A | 4/2018 |
| KR | 102145304 B1 | 8/2020 |
| WO | 2007044045 A2 | 4/2007 |

\* cited by examiner

SEPARATOR FOR SOLID OXIDE FUEL CELL (SOFC) STACK CAPABLE OF MINIMIZING SYSTEM VOLUME AND USAGE OF SEALANT

CROSS-REFERENCE TO RELATED APPLICATION

This application claims under 35 U.S.C. § 119(a) the benefit of priority to Korean Patent Application No. 10-2021-0170226, filed on Dec. 1, 2021, the entire contents of which are incorporated herein by reference.

BACKGROUND

(a) Technical Field

The present invention relates to a separator for fuel cells capable of minimizing the volume of a system and the use of sealants, and to a stack for fuel cells, more particularly, a stack for solid oxide fuel cells, including the same.

(b) Background Art

Solid oxide fuel cells (SOFCs) can freely use, as fuels, not only hydrogen but also conventional hydrocarbon-based fuels such as natural gas, propane gas, LPG, and next-generation alternative fuels such as biofuels through internal reforming, without using expensive external reformers. In addition, solid oxide fuel cells (SOFCs) are receiving a great deal of attention as one of the most promising next-generation power sources due to very high fuel conversion efficiency.

The SOFC unit cell includes an air electrode, a fuel electrode, and an electrolyte interposed therebetween. An oxidizing agent such as air or oxygen is supplied to the air electrode, and fuel such as hydrogen or hydrocarbon is supplied to the fuel electrode. When the air electrode and the fuel electrode are connected through an external circuit, oxygen is reduced at the air electrode due to the difference in oxygen partial pressure between the air electrode and the fuel electrode, and oxygen ions are transferred to the fuel electrode through the electrolyte, which is an ion conductor. At the fuel electrode, the oxygen ions react with $H_2$ or CO fuel to produce $H_2O$, $CO_2$, and heat. At this time, the emitted electrons conduct electrical work while moving to the air electrode through the external circuit.

To meet the demand for high power, multiple SOFC unit cells are interconnected to form a stack and thus establish systems having a wide capacity range from several W to MW or higher. For this reason, SOFCs have a wide range of applicability from portable power supplies to domestic, building, transportation and large-scale electricity generation applications.

SOFC unit cells are divided into cylindrical and flat types depending on the shape thereof. Flat SOFC unit cells are advantageous in that performance loss due to in-plane resistance is very small because current flows in a direction perpendicular to the unit cells. In addition, the flat SOFC unit cells can form denser stacks and thus have higher power density per unit volume than cylindrical SOFC unit cells.

However, flat fuel cells require a sealant for preventing the gases supplied to the air electrode and the fuel electrode from leaking, and this sealant has poor thermomechanical properties and low stability during thermal cycling. Low thermal stability may be a fatal disadvantage in view of the fact that the SOFC operates at a high temperature of 600° C. to 1,000° C.

Koran Patent No. 10-2145304 adopts a high-strength cell frame structure in order to realize the stability of conventional fuel cells, but this makes the components of the stack complicated and requires the use of a large number of sealants, thus aggravating the drawbacks of the system. In addition, the volume of the system increases due to the cell frame, and if the thickness of the intermediate separator is reduced in an attempt to reduce the volume, planar heat distribution may be nonuniform, and thus thermal stress may occur.

PRIOR ART DOCUMENT

Patent Document (Patent Document 1) Korean Patent No. 10-2145304

The above information disclosed in this Background section is only for enhancement of understanding of the background of the invention, and therefore it may contain information that does not form the prior art that is already known in this country to a person of ordinary skill in the art.

SUMMARY OF THE DISCLOSURE

The present invention has been made in an effort to solve the above-described problems associated with the prior art and to improve the performance of SOFCs.

It is one object of the present invention to provide a separator for fuel cells capable of minimizing the volume of a system and the use of sealants, and a stack for fuel cells including the same.

It is another object of the present invention to provide a separator for fuel cells capable of distributing the application of thermal and mechanical stress to a system as uniformly as possible, and a stack for fuel cells including the same.

The objects of the present invention are not limited to those described above. Other objects of the present invention will be clearly understood from the following description, and are able to be implemented by means defined in the claims and combinations thereof.

In one aspect, the present invention provides a separator for fuel cells having a polygonal shape and including a first surface and a second surface, wherein the separator for fuel cells includes a first inlet manifold and a first outlet manifold respectively formed to penetrate therethrough along a pair of opposite sides and being spaced apart from each other by a predetermined distance, and a second inlet manifold and a second outlet manifold respectively formed to penetrate therethrough along a remaining pair of opposite sides and being spaced apart from each other by a predetermined distance, the first surface includes a central portion recessed to a predetermined depth, a peripheral portion surrounding the central portion, and a first flow path recessed in the central portion, the first flow path connecting the first inlet manifold to the first outlet manifold, and the second surface includes a receiving portion recessed in the center thereof to provide a space in which a unit cell is loaded, and a second flow path recessed in the receiving portion, the second flow path connecting the second inlet manifold to the second outlet manifold.

Based on the first surface of the separator, the first inlet manifold and the first outlet manifold may be disposed in the central portion, and the second inlet manifold and the second outlet manifold may be disposed in the peripheral portion.

In another aspect, the present invention provides a stack for fuel cells including a unit cell interposed between a pair of separators including the separator described above, wherein the stack for fuel cells further includes a current collector interposed between the unit cell and each separator, a sealant disposed to surround an outside of the unit cell, and a metal sheet interposed between the sealant and one separator, wherein the metal sheet is loaded in a central portion of a first surface of one separator.

The sealant may include a first inlet hole formed to communicate with the first inlet manifold, a first outlet hole formed to communicate with the first outlet manifold, a second inlet hole formed to communicate with the second inlet manifold, and a second outlet hole formed to communicate with the second outlet manifold.

The metal sheet may have the same shape as the central portion of the separator, and the metal sheet may include, in a center thereof, a first through-hole formed along a formation direction of the first flow path of the separator, a second through-hole formed to communicate with the first inlet manifold, and a third through-hole formed to communicate with the second inlet manifold.

The metal sheet may be fastened to the separator through a simple bond.

Other aspects and preferred embodiments of the invention are discussed infra.

BRIEF DESCRIPTION OF THE DRAWINGS

The above and other features of the present invention will now be described in detail with reference to certain exemplary embodiments thereof, illustrated in the accompanying drawings which are given hereinbelow by way of illustration only, and thus are not limitative of the present invention, and wherein.

DETAILED DESCRIPTION

The objects described above, as well as other objects, features, and advantages, will be clearly understood from the following preferred embodiments with reference to the attached drawings. However, the present invention is not limited to the embodiments, and may be embodied in different forms. The embodiments are suggested only to offer a thorough and complete understanding of the disclosed context and to sufficiently inform those skilled in the art of the technical concept of the present invention.

Like reference numbers refer to like elements throughout the description of the figures. In the drawings, the sizes of structures may be exaggerated for clarity. It will be understood that, although the terms "first", "second", etc. may be used herein to describe various elements, these elements should not be construed as being limited by these terms, which are used only to distinguish one element from another. For example, within the scope defined by the present invention, a "first" element may be referred to as a "second" element, and similarly, a "second" element may be referred to as a "first" element. Singular forms are intended to include plural forms as well, unless the context clearly indicates otherwise.

It will be further understood that terms such as "comprise" or "has", when used in this specification, specify the presence of stated features, integers, steps, operations, elements, components, or combinations thereof, but do not preclude the presence or addition of one or more other features, integers, steps, operations, elements, components, or combinations thereof. In addition, it will be understood that, when an element such as a layer, film, region, or substrate is referred to as being "on" another element, it can be directly on the other element, or an intervening element may also be present. It will also be understood that when an element such as a layer, film, region, or substrate is referred to as being "under" another element, it can be directly under the other element, or an intervening element may also be present.

Unless the context clearly indicates otherwise, all numbers, figures, and/or expressions that represent ingredients, reaction conditions, polymer compositions, and amounts of mixtures used in the specification are approximations that reflect various uncertainties of measurement occurring inherently in obtaining these figures, among other things. For this reason, it should be understood that, in all cases, the term "about" should be understood to modify all such numbers, figures, and/or expressions. In addition, when numerical ranges are disclosed in the description, these ranges are continuous, and include all numbers from the minimum to the maximum, including the maximum within each range, unless otherwise defined. Furthermore, when the range refers to an integer, it includes all integers from the minimum to the maximum, including the maximum within the range, unless otherwise defined.

Figure 1:
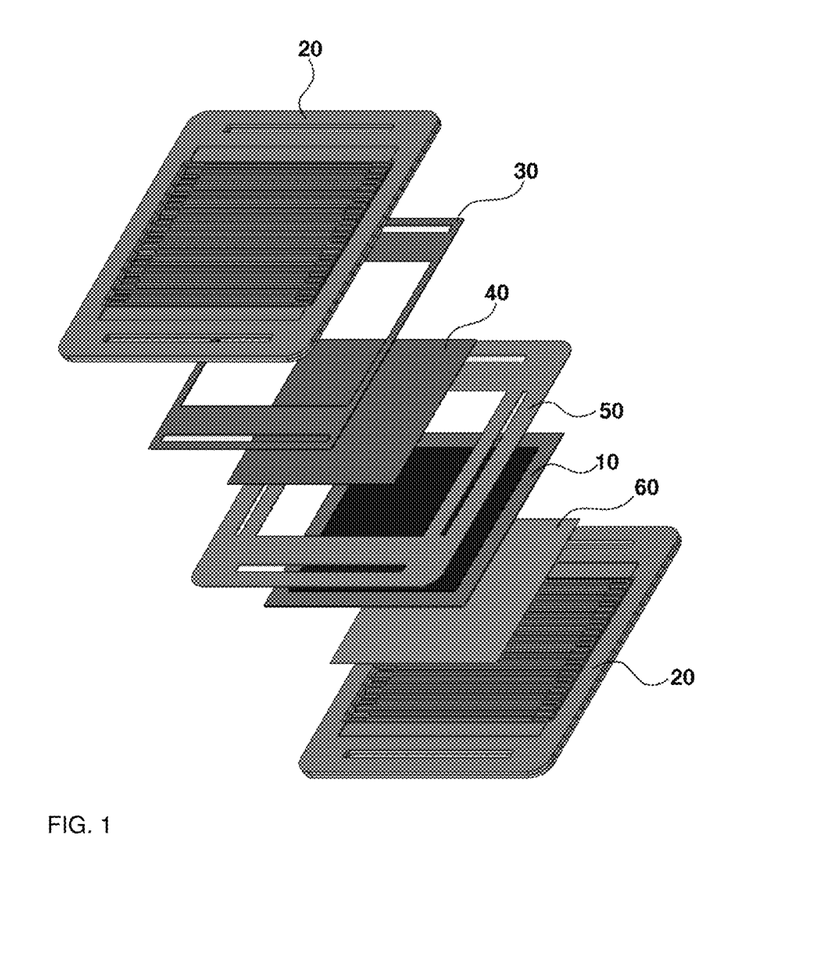
FIG. 1 is an exploded perspective view illustrating a main part of a fuel cell stack according to an embodiment of the present invention.

FIG. 1 is an exploded perspective view illustrating a fuel cell stack according to an embodiment of the present invention. Referring to FIG. 1, the fuel cell stack may have a structure in which a unit cell 10, including an air electrode, an electrolyte, and a fuel electrode, and a separator 20 are alternately stacked, and current collectors 40 and 60, a sealant 50, and a metal sheet 30 are stacked at appropriate positions therebetween. Specifically, the unit cell 10 is interposed between a pair of separators 20, current collectors 40 and 60 are inserted between the unit cell 10 and each separator 20, a sealant 50 disposed to surround the unit cell 10 is included on the outside of the unit cell 10, and a metal sheet 30 is interposed between the sealant 50 and one separator 20.

Figure 2:
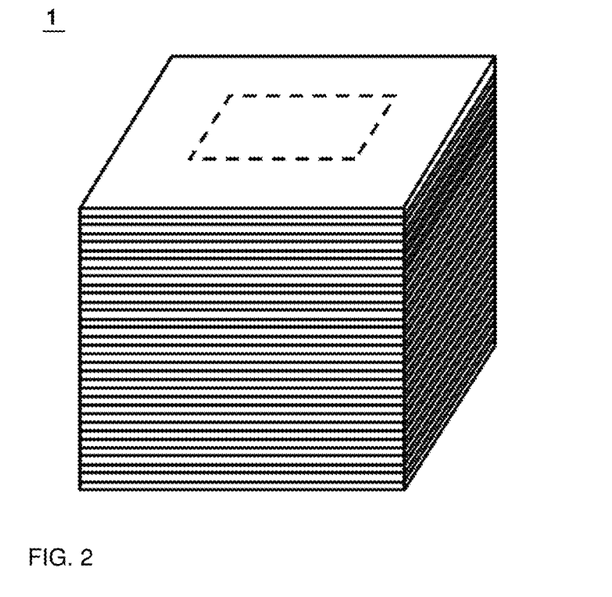
FIG. 2 is a perspective view illustrating a fuel cell stack according to an embodiment of the present invention.

FIG. 2 is a perspective view illustrating a fuel cell stack obtained by alternately stacking the unit cell 10 and the separator 20.

The fuel cell stack may be, for example, a solid oxide fuel cell (SOFC) stack.

Figure 3:
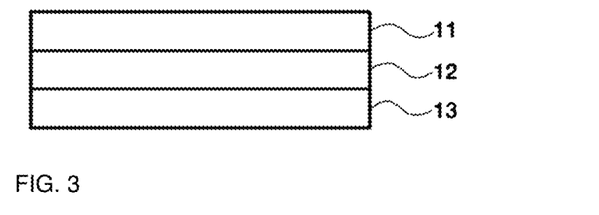
FIG. 3 is a cross-sectional view illustrating a unit cell included in the fuel cell stack according to an embodiment of the present invention.

FIG. 3 is a cross-sectional view illustrating the unit cell 10. Referring to FIG. 3, the unit cell 10 may include an air electrode 11, an electrolyte 12, and a fuel electrode 13.

When an oxidizing agent such as air or oxygen is supplied to the air electrode 11, a reaction occurs to produce an oxygen ion, as shown in the following Formula 1:

[Formula 1]

The oxygen ion moves to the fuel electrode 13 through the electrolyte 12. When fuel such as hydrogen or hydrocarbon is supplied to the fuel electrode 13, the oxygen ion reacts with the fuel to produce water, and, at the same time, emit an electron, as shown in the following Formula 2.

[Formula 2]

Here, the electrolyte 12 blocks permeation of the oxidizing agent and the fuel, and has no electron conductivity, but can permeate the oxygen ion.

Meanwhile, the oxygen ion formed from the oxidizing agent in the air electrode 11 moves toward the fuel electrode 13 depending on the concentration gradient of the oxygen ion, and the electron moves from the fuel electrode 13 to the air electrode 11 along an external circuit electrically connecting the air electrode 11 to the fuel electrode 13.

As described above, when the oxygen ion moves from the air electrode 11 to the fuel electrode 13 while maintaining the overall charge balance, useful electricity can be produced through the oxidation reaction involving the fuel. At this time, only pure water and heat, which can also be useful substances, are discharged as reaction byproducts.

The unit cell 10 may further include current collectors 40 and 60 between the air electrode 11 and one separator 20 and/or between the fuel electrode 13 and the other separator 20. As long as the current collectors 40 and 60 are configured to allow movement of electrons in the stack, the shape and type thereof are not particularly limited, and the current collectors 40 and 60 may be those commonly used in the technical field to which the present invention pertains.

Figure 4:
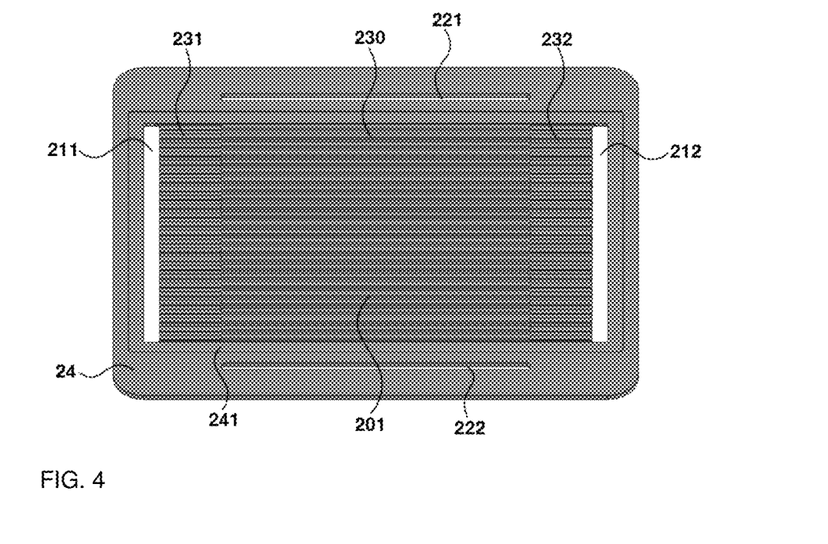
FIG. 4 illustrates a first surface of a separator included in the fuel cell stack according to an embodiment of the present invention.

FIG. 4 illustrates a first surface of the separator 20. Referring to FIG. 4, the first surface of the separator 20 may include a central portion 201 formed at a position in contact with the unit cell 10 when forming a stack and a peripheral portion 24 surrounding the central portion 201.

The separator 20 may include a first inlet manifold 211 and a first outlet manifold 212, configured to feed and discharge an oxidizing agent or fuel, wherein the first inlet manifold 211 and the first outlet manifold 212 are respectively formed to penetrate therethrough along a pair of opposite sides and are spaced apart from each other by a predetermined distance, and a second inlet manifold 221 and a second outlet manifold 222, configured to feed and discharge fuel and an oxidizing agent, wherein the second inlet manifold 221 and the second outlet manifold 222 are respectively formed to penetrate therethrough along a remaining pair of sides and are spaced apart from each other by a predetermined distance.

The first surface of the separator 20 may include a first flow path 230 that is recessed in the central portion and connects the first inlet manifold 211 to the first outlet manifold 212. The first flow path 230 is configured to guide the oxidizing agent or fuel from the first inlet manifold 211 to the first outlet manifold 212.

Figure 5:
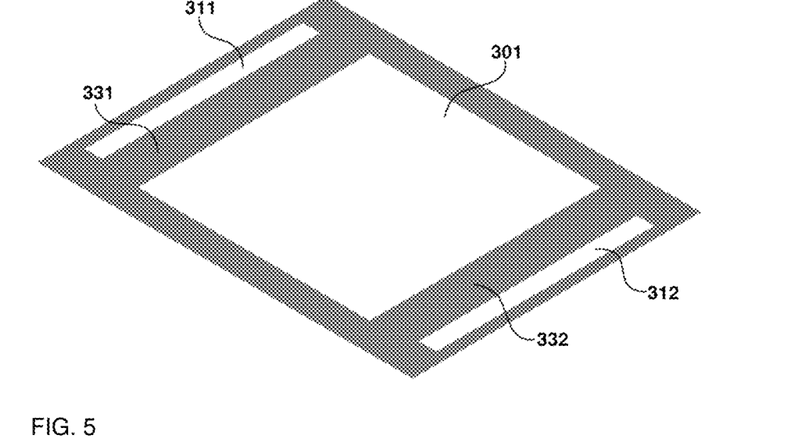
FIG. 5 is a schematic diagram illustrating a metal sheet included in the fuel cell stack according to an embodiment of the present invention.
Figure 6:
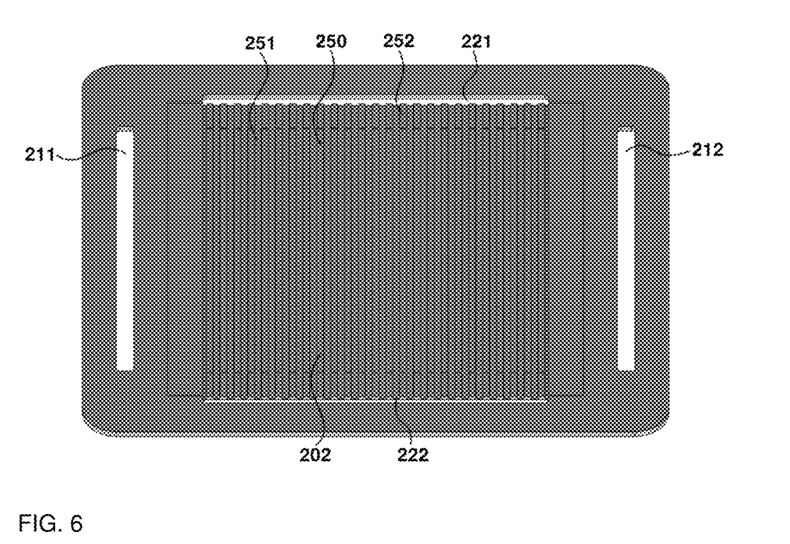
FIG. 6 illustrates a second surface of the separator included in the fuel cell stack according to an embodiment of the present invention.

The central portion 201 may have a shape and size the same as or similar to the unit cell 10. Specifically, the central portion 201 may have a tetragonal shape such as a square or a rectangle, and may be sized to cover all or part of the unit cell 10. FIGS. 4, 5, and 6 illustrate the configuration of the present invention on the assumption that the central portion 201 is square, but the present invention is not limited thereto, and the definition of the separator 20 should be interpreted as including a central portion 201 having a tetragonal shape or any shape that can be easily obtained by changing the same.

The central portion 201 may be formed as a physical element having a specific shape or form, or may be conceptually distinct from the separator 20.

The peripheral portion 24 is an area having a specific shape and size that extends around the periphery of the central portion 201.

Based on the first surface of the separator 20, the first inlet manifold 211 and the first outlet manifold 212 may be located in the central portion 201, and the second inlet manifold 221 and the second outlet manifold 222 may be located in the peripheral portion 24.

The present invention is characterized by forming a seating groove 241 that is configured to fasten a metal sheet 30 between the peripheral part 24 and the central part 201 to thereby equalize the stress applied to the sealant 50 to be described later, minimize the volume, and ensure uniformity of fuel flow.

FIG. 5 illustrates a metal sheet 30. The metal sheet 30 is fastened to the peripheral portion 24 formed on the first surface of the separator 20, more specifically, to the seating groove 241. The metal sheet 30 may include, in the center thereof, a first through-hole 301 that penetrates the same along a formation direction of the first flow path 230, that is, in a direction extending from the first inlet manifold 211 to the second outlet manifold 212. The metal sheet 30 may further include a second through-hole 311 formed so as to communicate with the first inlet manifold 211 at a predetermined distance from the first through hole 301. The metal sheet 30 may further include a third through-hole 312 formed so as to communicate with the first outlet manifold 212 at a predetermined distance from the first through-hole 301. The first, second, and third through-holes 301, 311, and 312 are formed so as not to interfere with the feed or discharge of an oxidizing agent or fuel in the stack.

Meanwhile, the metal sheet 30 includes a first flow path protector 331, which contacts the first flow path 230 between the first through-hole 301 and the second through-hole 311, and a second flow path protector 332, which contacts the second flow path 330 between the first through-hole 301 and the third through-hole 312. These serve to equalize the stress between the first flow path 230 and the separator 20 to thus increase the stability of the stack.

FIG. 6 illustrates a second surface of the separator 20. Referring to FIG. 6, the second surface may include a receiving portion 202 that is depressed in the center thereof to provide a space in which the unit cell 10 is loaded. In addition, the second surface may further include a second flow path 250 that is recessed in the receiving portion 202 to connect the second inlet manifold 221 to the second outlet manifold 222.

The receiving portion 202 may be divided into a first area 251, in which the current collector 60 is embedded, and a second area 252, in which the unit cell 10 is loaded.

Figure 7:
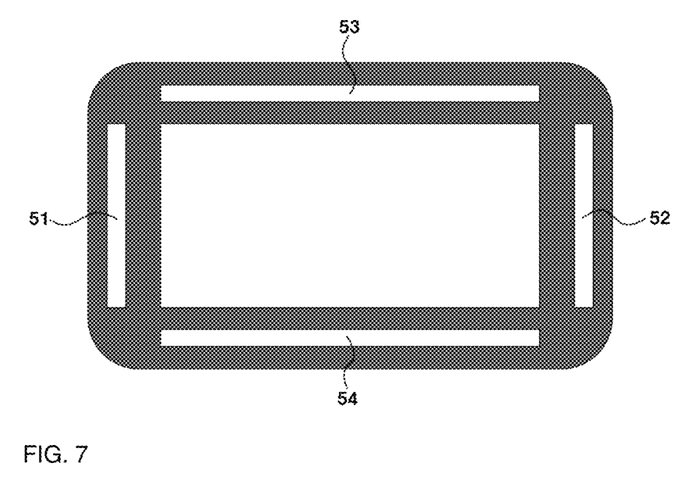
FIG. 7 illustrates a sealant included in the fuel cell stack according to an embodiment of the present invention.

FIG. 7 illustrates the sealant 50. The sealant 50 may be disposed to surround the unit cell 10, and may include a space in which the unit cell 10 can be fastened to the center thereof.

The sealant 50 may include a first inlet hole 51 formed to communicate with the first inlet manifold 211, a first outlet hole 52 formed to communicate with the first outlet manifold 212, a second inlet hole 53 formed to communicate with the second inlet manifold 221, and a second outlet hole 54 formed to communicate with the second outlet manifold 222, so as not to obstruct the flow of the oxidizing agent and fuel in the stack.

Figure 8:
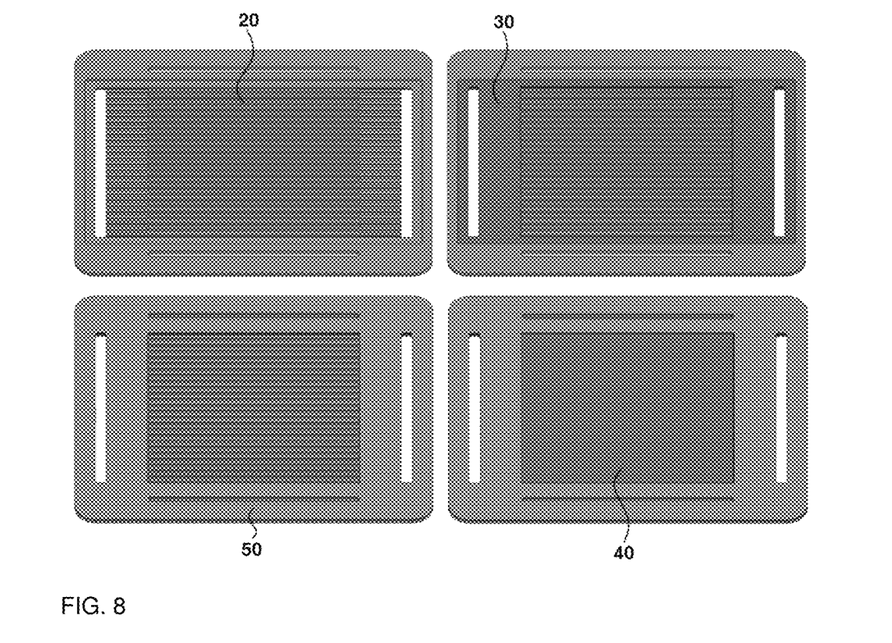
FIG. 8 is a reference diagram illustrating a stacking sequence on an air electrode of the separator according to an embodiment of the present invention.

FIG. 8 is a reference diagram for illustrating a stacking sequence of the fuel cell stack according to the present invention. Specifically, FIG. 8 illustrates that the separator 20, the metal sheet 30, the sealant 50, and the current collector 40 are sequentially stacked from the top of the stack shown in FIG. 1.

The metal sheet 30 is simply attached to the first surface of the separator 20. At this time, the seating groove 241 to which the metal sheet 30 is attached is recessed to the same depth as the thickness of the metal sheet 30. Then, a sealant 50 having the same size as the separator 20 is stacked, and the current collector 40 is disposed.

Figure 9:
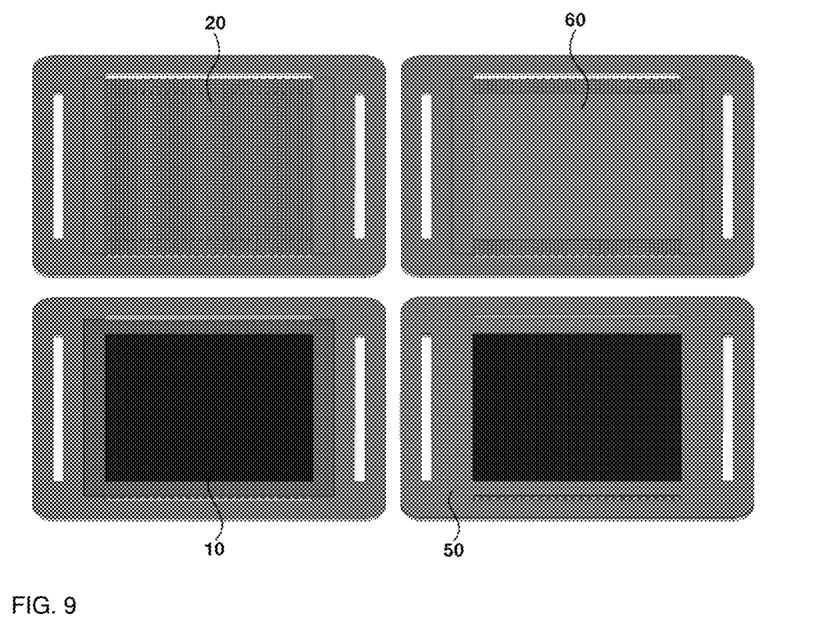
FIG. 9 is a reference diagram illustrating a stacking sequence on a fuel electrode of the separator according to an embodiment of the present invention.

FIG. 9 is a reference diagram for illustrating a stacking sequence of the fuel cell stack according to the present invention. Specifically, FIG. 9 illustrates that the separator 20, the current collector 60, the unit cell 10, and the sealant 50 are sequentially stacked from the bottom of the stack shown in FIG. 1.

The current collector 60 is attached to the second surface of the separator 20. The unit cell 10 is stacked thereon. The sealant 50 is stacked to surround the unit cell 10.

FIGS. 8 and 9 are provided for better understanding of how the elements of the fuel cell stack are stacked and to show that stacking is performed in the order of the separator 20, the current collector 60, the unit cell 10, the sealant 50, the current collector 40, the metal sheet 30, and the separator 20.

Figure 10:
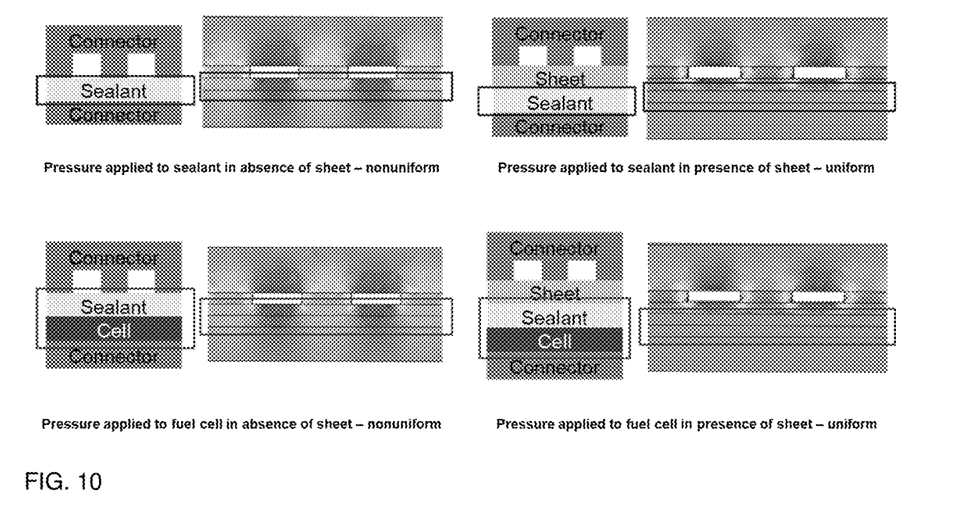
FIG. 10 is a diagram illustrating the result of a simulation of the pressure applied to the sealant depending on the presence or absence of the metal sheet according to an embodiment of the present invention.

FIG. 10 illustrates the result of a simulation of the pressure applied to the sealant 50 and the unit cell 10 disposed under flow paths 230 and 250 depending on the presence or absence of a metal sheet 30 according to an embodiment of the present invention, which indicates that when the metal sheet 30 is present, it is possible to uniformly distribute the stress to the sealant 50.

As apparent from the foregoing, the separator for a fuel cell according to the present invention enables the oxidizing agent and fuel to flow in a counter-flow manner in the fuel cell stack, thereby minimizing thermal variation in each unit cell.

In addition, the separator for fuel cells according to the present invention enables portions contacting the sealant to be flush with one another, thereby uniformizing the mechanical stress applied to the sealant.

The separator is integral (unitary) which is thus advantageous for thermal stress distribution.

The fuel cell stack according to the present invention may be applied both to a counter-flow type stack structure and to a cross-flow type stack structure.

The effects of the present invention are not limited to those mentioned above. It should be understood that the effects of the present invention include all effects that can be inferred from the description of the present invention.

The present invention has been described in detail with reference to embodiments thereof. However, it will be appreciated by those skilled in the art that changes may be made in these embodiments without departing from the principles and spirit of the present invention, the scope of which is defined in the appended claims and their equivalents.

What is claimed is:

1. A stack for fuel cells, comprising a unit cell interposed between a pair of separators, wherein each of the separators has a polygonal shape and comprises:
   a first surface and a second surface;
   a first inlet manifold and a first outlet manifold respectively formed to penetrate through the separator along a pair of opposite sides and being spaced apart from each other by a predetermined distance; and
   a second inlet manifold and a second outlet manifold respectively formed to penetrate through the separator along a remaining pair of opposite sides and being spaced apart from each other by a predetermined distance; and wherein
   the first surface comprises:
   a central portion recessed to a predetermined depth;
   a peripheral portion surrounding the central portion; and
   a first flow path recessed in the central portion, the first flow path connecting the first inlet manifold to the first outlet manifold, and
   the second surface comprises:
   a receiving portion recessed in a center thereof to provide a space in which a unit cell is loaded; and
   a second flow path recessed in the receiving portion, the second flow path connecting the second inlet manifold to the second outlet manifold; and
   wherein the stack for fuel cells further comprises:
   a current collector interposed between the unit cell and each separator;
   a sealant disposed to surround an outside of the unit cell; and
   a metal sheet interposed between the sealant and one separator,
   wherein the metal sheet is loaded in a central portion of a first surface of one separator; and
   wherein the metal sheet has a same shape as the central portion of the separator, and
   the metal sheet comprises, in a center thereof, a first through-hole formed along a formation direction of the first flow path of the separator, a second through-hole formed to communicate with the first inlet manifold, and a third through-hole formed to communicate with the second inlet manifold.

2. The stack for fuel cells according to claim 1, wherein, based on the first surface, the first inlet manifold and the first outlet manifold are disposed in the central portion, and the second inlet manifold and the second outlet manifold are disposed in the peripheral portion.

3. The stack for fuel cells according to claim 1, wherein the sealant comprises:
   a first inlet hole formed to communicate with the first inlet manifold;
   a first outlet hole formed to communicate with the first outlet manifold;
   a second inlet hole formed to communicate with the second inlet manifold; and
   a second outlet hole formed to communicate with the second outlet manifold.

4. A solid oxide fuel cell comprising the stack for fuel cells according to claim 1.

* * * * *